United States Patent [19]

Kimbara et al.

[11] Patent Number: 4,568,815
[45] Date of Patent: Feb. 4, 1986

[54] LASER PERFORATING APPARATUS

[75] Inventors: Yoshihide Kimbara; Yooichi Sato, both of Aichi, Japan

[73] Assignee: Mitsubishi Denki Kabushiki Kaisha, Tokyo, Japan

[21] Appl. No.: 528,390

[22] Filed: Sep. 1, 1983

[30] Foreign Application Priority Data

Sep. 1, 1982 [JP] Japan ................... 57-151901

[51] Int. Cl.⁴ ............................................. B23K 26/08
[52] U.S. Cl. .......................... 219/121 LK; 219/121 L; 219/384
[58] Field of Search .................. 219/121 LK, 121 LL, 219/121 LM, 121 L, 384

[56] References Cited

U.S. PATENT DOCUMENTS

| 4,025,752 | 5/1977 | Whitman, III | 219/384 |
| 4,218,606 | 8/1980 | Whitman, III | 219/121 LK X |
| 4,297,559 | 10/1981 | Whitman, III | 219/121 LK X |
| 4,447,709 | 5/1984 | Whitman, III | 219/384 |

Primary Examiner—C. L. Albritton
Assistant Examiner—Alfred S. Keve
Attorney, Agent, or Firm—Sughrue, Mion, Zinn, Macpeak, and Seas

[57] ABSTRACT

A laser perforator device is controlled with respect to laser power and duty ratio in a manner so as to produce uniform perforations at a selected pitch in a workpiece, such as, a travelling plastic or metallic web. The speed of the workpiece is detected and is combined with the values for the desired pitch and duty ratio to produce pulses of the correct duration. These pulses control a switch that passes a laser level control signal to the laser that perforates the workpiece. The laser level control signal responds to the speed to provide uniform energy density to the workpiece.

16 Claims, 12 Drawing Figures

LASER PERFORATING APPARATUS

BACKGROUND OF THE INVENTION

This invention relates to a laser perforating apparatus for perforating workpieces such as paper, plastic film, or metal plate by means of a laser beam.

A laser perforating apparatus as shown in FIG. 1 has been heretofore proposed, wherein a laser beam 2 powered from a laser oscillator 1 is periodically passed by a rotary shutter rotatable via a motor 3. The laser beam 2 is thus periodically prevented from passing and is thus reflected. The laser beam 6 thus relfected is absorbed by a damper 5. The laser beam 11 which has passed through the rotary shutter 4 is led by a mirror 7 or the like to a working position and is condensed by a lens 8 to a predetermined position on a workpiece 9, so that the workpiece 9 is formed with a hole 10, the dimensions of which are determined by the speed of the motor 3 and the configuration of the rotary shutter 4, and the speed at which the workpiece 9 is moved.

The conventional laser perforating apparatus is fabricated as aforementioned to thus require the motor 3 to be rotated at about 30,000 rpm when the workpiece 9 is moved at higher speeds, for example, 120 m/min., to form holes with a pitch of 1 mm. Apparently, it has been impossible to realize such a motor in practice. Such a motor has a limited mechanical life, if any, and both the motor 3 and the shutter 4 are subjected to a high revolution rate which causes noise such as air cutting sounds and vibration noise, thereby creating an adverse work environment.

During the period of the passage of the rotary shutter 4 through the laser beam 2, or the reflection of the laser beam on the rotary shutter, disadvantages are caused such that the passing laser beam 11 is converted to a less than circular form when edges 12 of the rotary shutter 4 interfere with the laser beam 2, and the accuracy of the hole 10 to be formed in the workpiece 9 is de-graded by diffraction by the edges 12 so that the laser beam impinges on undesired portions.

SUMMARY OF THE INVENTION

This invention is provided to eliminate the aforementioned defects inherent in the conventional apparatus. It is an object of the invention to provide a laser perforating apparatus capable of forming a well-shaped hole at high speed without the generation of noise.

BRIEF DESCRIPTION OF THE DRAWINGS

The invention will now be described with reference to the accompanying drawings, in which.

DETAILED DESCRIPTION OF THE PREFERRED EMBODIMENTS

Figure 1:
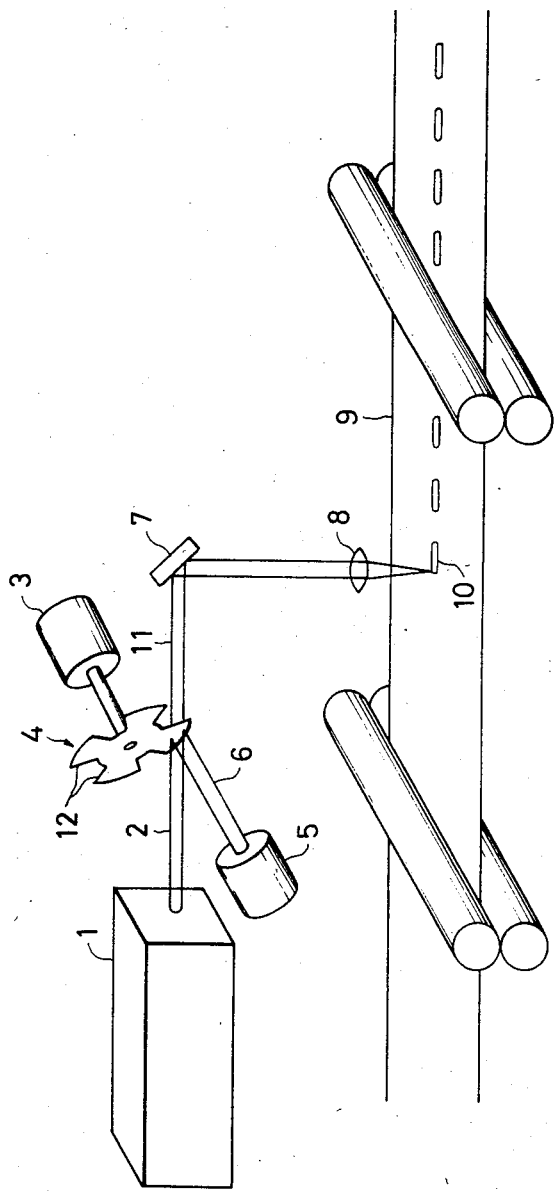
FIG. 1 is a view showing a conventional laser perforator.
Figure 2:
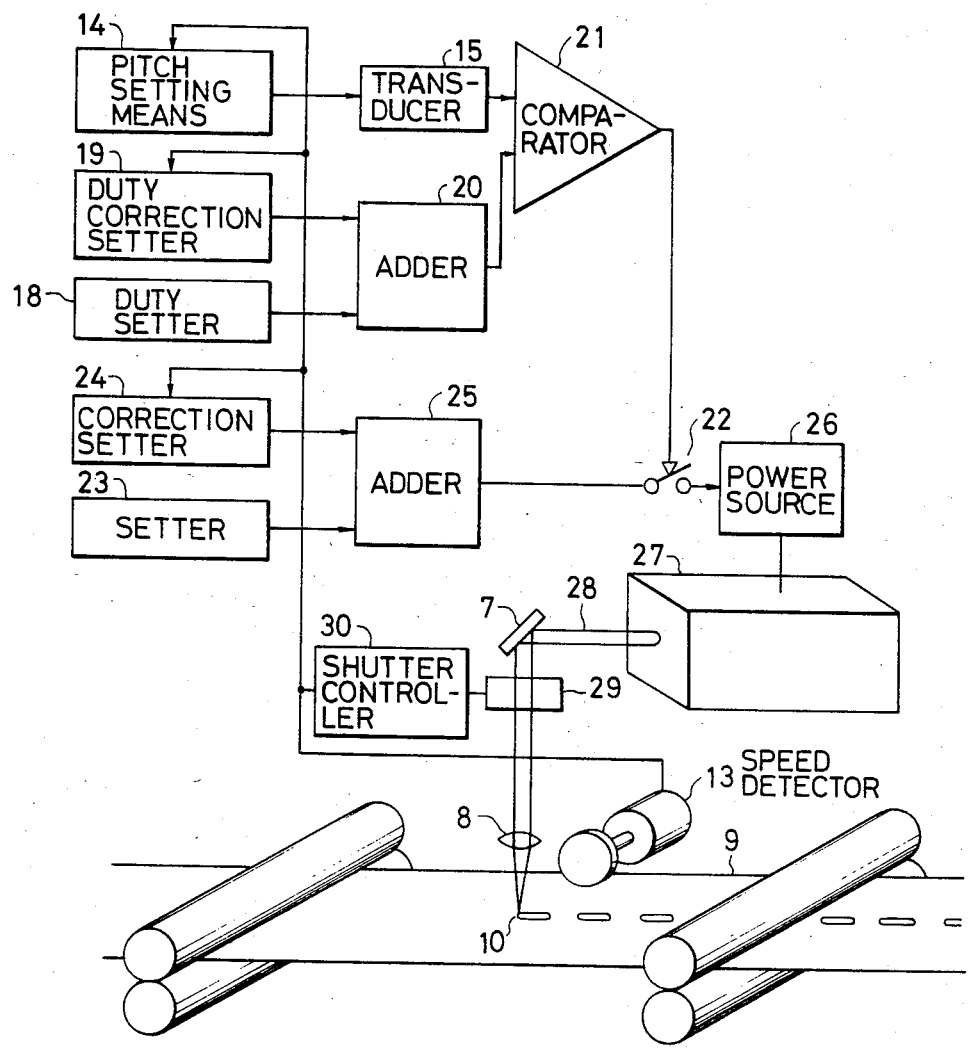
FIG. 2 is a representation showing an apparatus in which the present invention is embodied.

FIG. 2 shows an apparatus in which the invention is embodied, wherein like numerals are used to designate like or corresponding parts in FIG. 1.

The apparatus in accordance with this embodiment is adapted so that the speeds at which workpieces 9 such as paper, plastic and the like are detected by a speed detector 13 such as a tachometer. Pitch setting means 14 functions to determine the distance, that is, the pitch between holes 10 formed in the workpiece 9. This pitch value is corrected by a signal from the speed detector 13 and is then produced as the output. In response to this output, a pulse with a predetermined repetition rate or frequency is produced as an output by a voltage-frequency transducer 15. In this instance, a pulse generator is composed of the pitch setting means 14 and the transducer 15.

Figure 3:
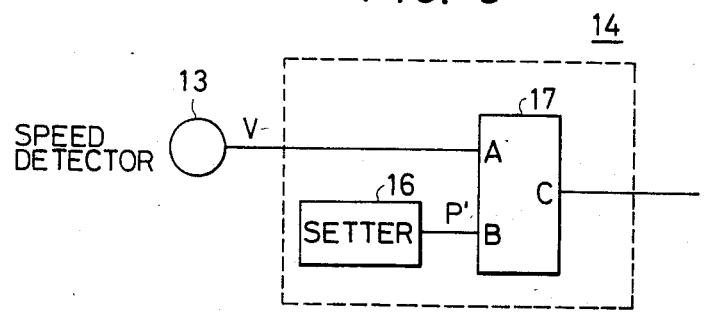
FIG. 3 is a representation of one form of a pitch setter.

FIG. 3 shows one form of pitch setting means 14, wherein a signal from the speed detector 13 is of a value corresponding to a speed V at which the workpiece 9 is moved. Pitch setting means 16 as shown serves to output a signal corresponding to a pitch $P^1$ as set. On the other hand, a divider 17 is arranged so that signals V and $P^1$ are applied as inputs A and B, respectively, and such that a signal $V/P^1$ is generated as the output C of the transducer 15. This output is a signal corresponding to the pulse frequency for perforation. The voltage-frequency transducer 15 of FIG. 2 is adapted to output a signal of a triangular wave-form having a constant amplitude with a frequency proportional to the output signal of the pitch setting means 14. If the frequency of the triangular wave generated as the output from the voltage-frequency transducer 15 is expressed by F, it may be defined by the equation: $F = V/P$ (Hz). Output signals of a duty-setter 18 and a duty correction setter 19 are respectively added by an adder 20 which forms a first operator. The output signal of the adder 20 is applied as one input to a comparator 21.

Figure 9:
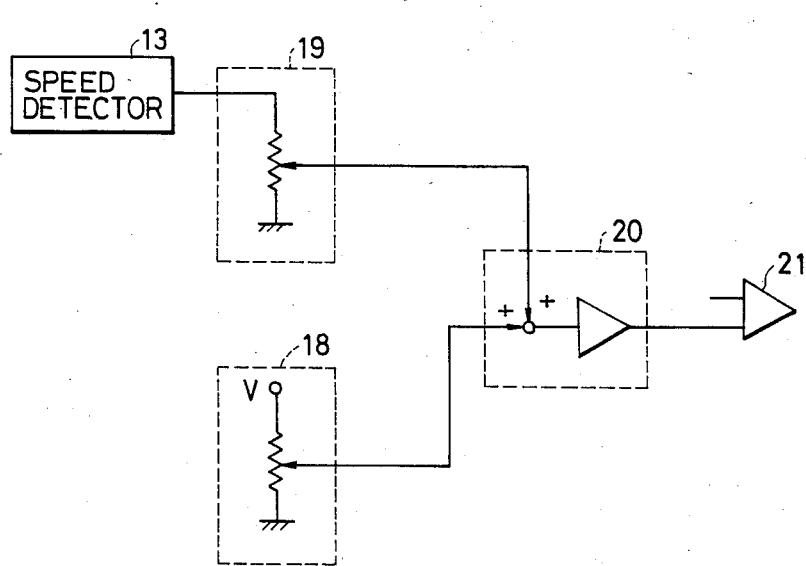
FIG. 9 is a detailed views of an arrangement which is composed of a duty setter, duty correction setter, and an adder according to the present invention.

FIG. 9 is a detailed view showing the construction of the duty setter 18, the duty correction setter 19, and the adder 20. The duty setter 18 is a voltage setter which is formed with the use of a resistance. The duty correction setter 19 is formed of an attenuator using a resistance and is adapted to change its output in response to the detected voltage of the tachogenerator 13. The adder 20 serves to add the set voltage of the duty setter 18 to the attenuated voltage of the duty correction setter 19, and is composed of an amplifier circuit.

The comparator 21 functions, as shown in FIG. 2, to compare the triangular wave from the voltage-frequency transducer 15 with the output from the adder 20 and is adapted so that the output voltage from the adder 20 causes the generation of a signal such that the period during which it is above the voltage of the triangular wave is converted to an "on" period for the pulse whereas the period during which it is short thereof is made into an "off" period, whereby a switch 22 operationally opened and closed. The output signals of a setter 23 for setting the output value of the laser output and a correction setter 24 for correcting the laser output in response to the signal from the speed detector 13 are respectively added to one another by an adder 25 forming a second operator. The output signal of the adder 25 is applied as the input to a power source 26 via the switch 22.

Figure 10:
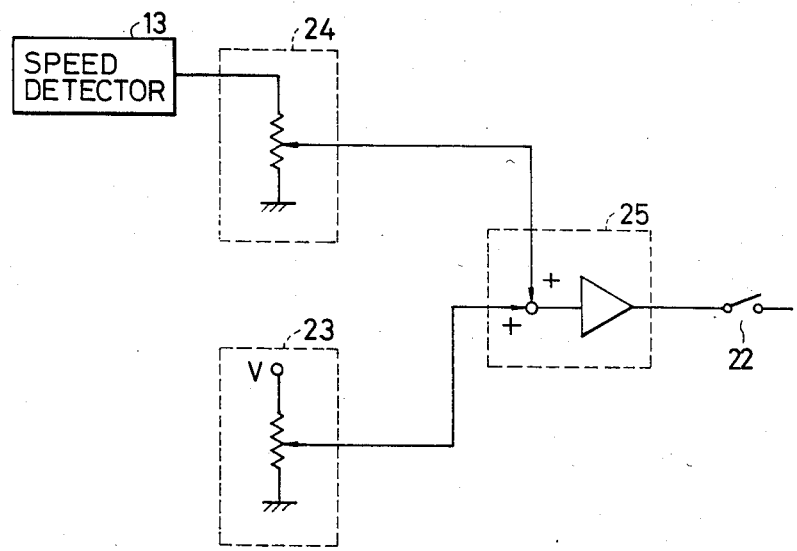
FIG. 10 is a detailed view of an arrangement which is composed of a duty setter, correction setter and an adder according to the present invention.

FIG. 10 is a detailed view showing the structure of the setter 23, correction setter 24, and the adder 25. The setter 23 is a voltage setter which is formed using a resistance. The correction setter 24 is formed of an attenuator using a resistance and is adapted to change its output in response to the detected voltage of the tachogenerator 13. The adder 25 serves to add the set voltage of the setter 23 to the attenuated voltage of the correction setter 24 and is composed of an amplifier circuit. The power source 26 of FIG. 2 is adapted to produce a laser output corresponding to the output of the adder 25. This laser output is made intermittent by means of the switch 22, whereby a pulse discharge is effected by laser oscillator 27. In this connection, it is noted that an SD type carbon-dioxide gas laser or a coaxial carbondioxide gas laser may be employed as the laser oscillator. The laser oscillator 27 is adapted to produce a pulsed laser beam 28 corresponding to the pulse discharge of the power source 26. The pulsed laser beam 28 is led by the mirror 7 or the like to a working position and is condensed thereat by the lens 8, so that holes, each of predetermined configuration, may be spaced at predetermined intervals on the workpiece 9. A shutter 29 is controlled by a shutter controller 30 to initiate perforation when the detected signal from the speed detector 13 reaches a given value, that is, when the workpiece is moved at a given speed. Thus, this prevents the workpiece from being unstably perforated at a low speed.

Figure 11:
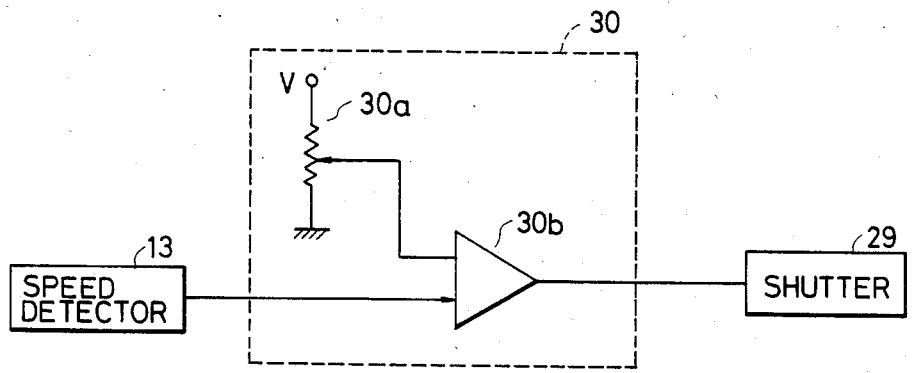
FIG. 11 is a view showing a specific form of shutter controller in accordance with the present invention.

FIG. 11 is a view showing an example of the shutter controller 30, which is composed of a voltage setter 30a and a comparator 30b, and which is adapted to generate a signal allowing the comparator 30b to open the shutter 29 when the detected voltage from the tachometer 13 is higher than the set voltage of the voltage setter 30b.

The operation of the apparatus according to the embodiment of the present invention shown in FIG. 2 will be apparent from the following description.

Figure 4:
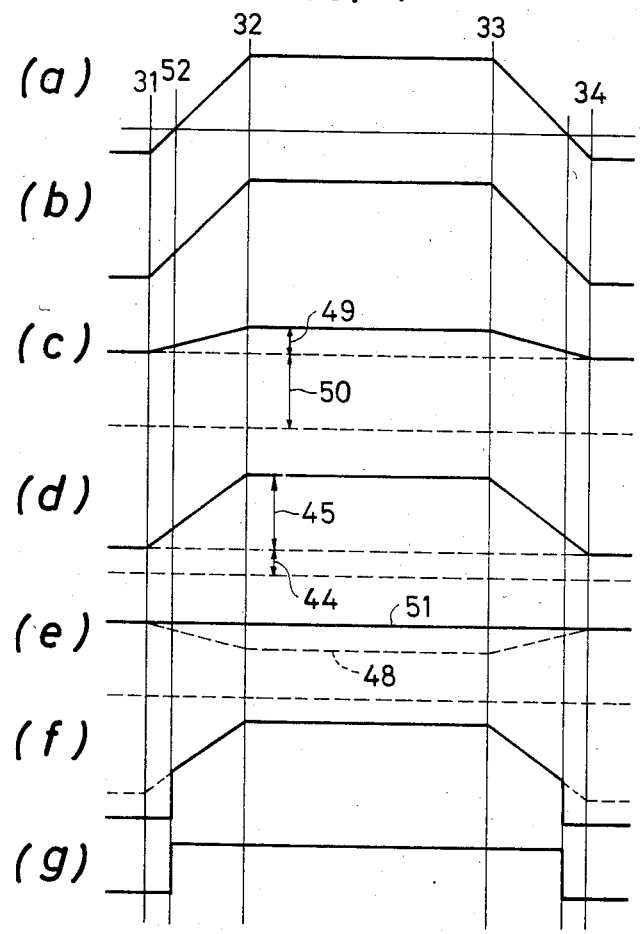
FIGS. 4 and 5 are time charts explanatory of the operation of the apparatus according to one embodiment of the present invention.
Figure 5:
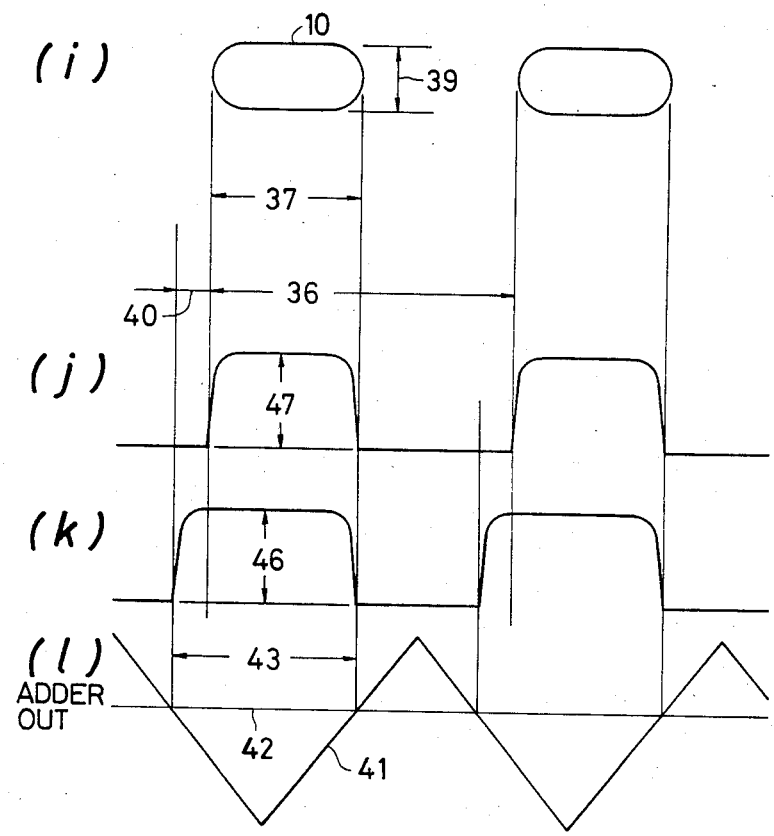

FIGS. 4 and 5 are timing charts for the purpose of illustrating the operation of the apparatus according to the instant embodiment. FIG. 4a shows the travel speed of the workpiece 9, as moved by conveyance means, and the signal detected by the speed detector 13. The travel speed of the workpiece 9 is determined so that the latter initiates its acceleration at a point 31, reaches a given speed at a point 32 and starts its deceleration at a point 33 when the operation is finished, and then stops at a point 34. FIG. 4b shows the magnitude of the output from the pulse generator, more specifically the magnitude of the output signal of the voltage-frequency transducer 15, that is, the value of the frequency, which varies in response to the travel speed of the workpiece 9. The feed speed of the workpiece 9, the frequency of the output of the voltage-frequency transducer 15, and the output of the setter 16 shown in FIG. 3, that is, the set pitch are V, E, and P', respectively, are related by means of the equation $F=V/P'$. The pitch may be expressed by $P'=V/F$. The pitch of the actually formed hole 10 is written as P, and the relation may be written $P=V/F$. Thus, the equation $P=P'$ may be obtained from the aforementioned equation above so that the output of the pitch setter 14 may be set as the pitch P. This means that holes 10 of a given pitch may be perforated in the workpiece even if the travel speed V is varied.

The duty setter 18 is adapted to set the "on" period and "off" period for the power source 26. The set value may be corrected by the output from the duty correction setter 19, which is variable in response to the signal from the speed detector 13, and the adder 20 whereby a signal is applied to the other input terminal of the comparator 21. This signal is shown in FIG. 5l as signal 42.

The output signal from the voltage-frequency transducer 15 is a triangular wave as indicated at 41 between periods 32 and 33 in FIG. 5l. The comparator 21 generates a signal which sets the switch 22 "on" for a period 43 during which the signal 42 is higher than the signal 41.

On the other hand, the laser output setter 23 is adapted to set a laser output value as indicated in FIG. 4d and also sets the laser output value 44 when the travel speed V of the workpiece 9 is slow. The set value is corrected as the travel speed V of the workpiece 9 increases and becomes that indicated at 45 in FIG. 4d. This correction is made by adding the output from the laser output correction setter 24, which is varied in response to the signal from the speed detector 13, to the set value 44 by means of the adder 25. The output from the adder 25 is applied to the power source 26 via the switch 22. The power source 26 generates power corresponding to the laser output value from the adder 25. This generated power is made intermittent by means of the switch 22. Accordingly, the output wave from the power source 26 becomes that shown in FIG. 5k. That is, pulse power 46 is applied to the laser oscillator 27, which generates the laser beam 28 in the form of a wave as shown in FIG. 5j. However, the leading edge of the laser beam 28 is delayed by a given time (the period as indicated at 40 in FIG. 5), namely about 100 μsec., with respect to the leading edge of the application of power 46 so that the length 37 (FIG. 5i) of the hole 10 actually formed corresponds to less than the output period of the power source 26. This phenomenon is more evident with higher frequency. For instance, when the frequency is 2 kHz, the delay 40 is 20%.

For this reason, the single value (indicated at 50 in FIG. 4c) set by the duty setter 18 renders the duty ratio of the laser beam 28 as actually generated (shown by a dash line 48 in FIG. 4e) lower as the frequency F is raised. In order to prevent the duty ratio from actual lowering, the variance (indicated at 49 in FIG. 4c) in the travel speed V of the workpiece 9 is obtained as a correction value by the duty correction setter 19, and the correction value is added by the adder 20 to the set value from the duty setter 18. In accordance therewith, the duty ratio of the laser beam 28 as actually produced is made constant, as indicated by 31 of FIG. 4a, so that the length 37 of the hole 10 with respect to the pitch 36 of the latter formed in the workpiece 9, that is, the duty ratio, may be made constant even if the travel speed V of the workpiece 9 is varied. In this instance, since the shutter 29 is controlled by the controller 30 so as to be opened as shown in FIG. 4g at a point 52 when the travel speed V of the workpiece 9 reaches a certain value, the laser output value shown in FIG. 4d becomes as shown in FIG. 4f after the passage of the shutter 29, while the shutter 29 is controlled so as to be open when the travel speed of the workpiece 9 reaches a predetermined value, so that perforation is stably carried out.

Figure 6:
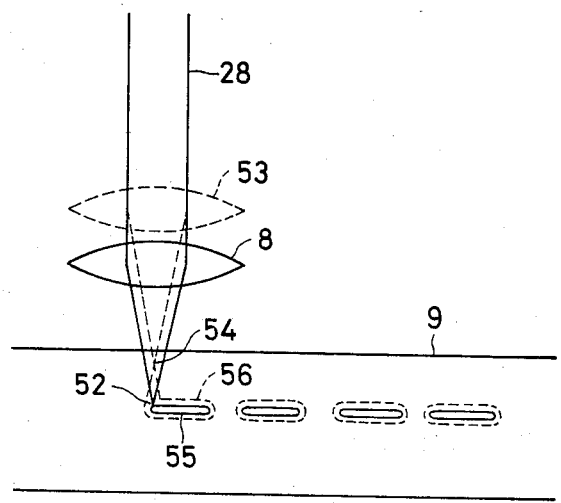
FIG. 6 is an explanatory view showing the manner in which the width of the hole is changed.

The width 39 of the hole 10 formed in the workpiece 9 as shown in FIG. 5i may be controlled as shown in FIG. 6. The pulse laser beam 28 is condensed by the lens 8 and the finest hole 55 may be bored through the workpiece 9 when machined by the focus 52 of the lens 8. The lens 8 may be focussed at 54 by shifting the position of the lens 8 to the position shown by a dashed line 53, to widen the width of the laser beam 28 which impinges on the workpiece 9. A hole 56 of a desired width 39 can thus be easily made.

Figure 8:
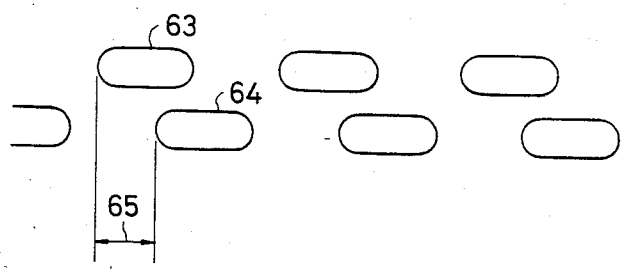
FIG. 8 is a view explanatory of the mode of operation of the embodiment shown in FIG. 7.
Figure 7:
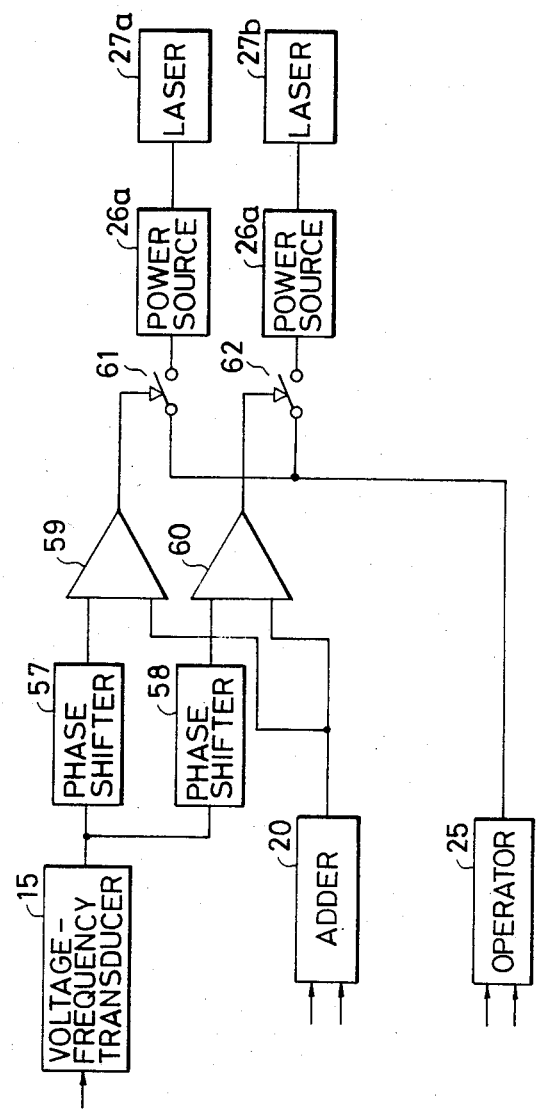
FIG. 7 is a representation explanatory of another embodiment of the present invention.

FIG. 7 illustrates another embodiment of the invention, wherein a plurality of power sources and laser oscillators are provided to form substantially parallel holes in the workpiece (FIG. 8).

To this end, the voltage-frequency transducer 15 is adapted to apply its output as an input to comparators 59, 60 corresponding to the respective laser oscillators via a pair of phase shifters 57, 58. These phase shifters 57, 58 are capable of shifting the phase of the output waveform of the voltage-frequency transducer 15 and provide a time difference in the actuation of the switches 61, 62, whereby the holes punched by the pulsed laser beams of the respective laser oscillators are as indicated at 63, 64 in FIG. 8. This arrangement serves to shift or stagger the location of the perforations by the time difference 65 of the phase shifter. This time difference 65 may be set as desired by changing the value of the phase shift provided by the phase shifters 57, 58. Numerals 26a, 26b designate power sources connected to the switches 61, 62. Numerals 27a, 27b denote laser oscillators connected to the power sources 27a, 27b.

Although this embodiment has been described with reference to two phase shifters, it is apparent that a plurality of phase shifters may be provided to operate a plurality of switches 59 to emit several pulsed laser beams simultaneously. A plurality of holes may be formed and the staggering therebetween can be varied by changing the extent of shift of each hole. By dividing the pulsed laser beam into segments, holes in a plurality of rows may be successively punched.

In the aforementioned embodiment, the duty setter 18 and the setter 23 and so on may be provided as analog setters, and the comparator 21 adapted to make an analog comparison. However, the comparator 21 may be fabricated as a digital comparator to apply the output of the voltage-frequency transducer 15 to a counter, the counter value of the counter and the digital value of the adder 20 (as A/D converted) being compared with each other to obtain the output signal.

Figure 12:
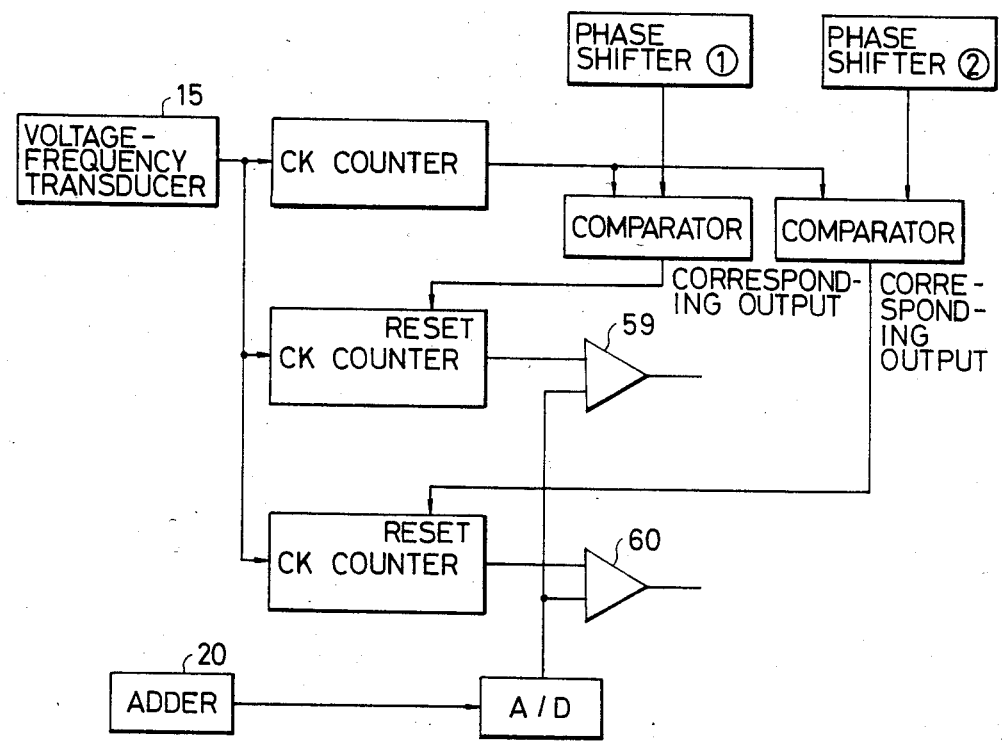
FIG. 12 is a representation explanatory of a further embodiment of the present invention.

The phase shifters 57, 58 may also be fabricated in an analog arrangement as well as a digital arrangement. In this latter instance, the overall configuration may be simplified by the employment of a counter for counting the output of the voltage-frequency transducer 15, a comparator for comparing the output of the counter with the set phase shift of the phase shifter, another counter reset by the output signal of the comparator and for counting the output of the voltage-frequency transducer 15, and a further comparator for comparing the output of the last-mentioned counter with the digital output value of the adder 20. (as A/D converted). FIG. 12 shows one example of such a device.

As aforementioned, the present invention is designed so that a pulsed laser beam is electrically generated with the pulse frequency, pulse width, and the laser output phase shift controlled. Several advantages are derived from such an arrangement; particularly, high speed punching of a workpiece may be made without noise, and perforation in a predetermined form may be carried out as desired.

What is claimed is:

1. A laser perforating apparatus for successively forming holes of a predetermined shape at given intervals in a workpiece, comprising:
   a speed detector for detecting a travel speed of said workpiece;
   a pulse generator to which the detection signal from said speed detector is applied as an input, for generating a pulse having a frequency varied in response to said detection signal, for maintaining the pitch of the holes to be formed in said workpiece constant;
   means for setting a ratio of an "on" period of a power source means to an "off" period thereof;
   a first operator for correcting the set value of said setting means in response to the detection signal of said speed detector;
   laser output setting means for setting the output value of the laser beam;
   a second operator for correcting the set value of said laser output setting means in response to the detection signal of said speed detector;
   switch means connected between said second operator and said power source means, said power source means having a voltage varied in response to the output of said second operator;
   comparator means for comparing the pulse generated by said pulse generator with the signal from said first operator to control the opening and closing of said switch means; and
   at least one laser oscillator receiving an output of said power source means, for generating a pulsed laser beam for perforating said workpiece.

2. A laser perforating apparatus as claimed in claim 1, said speed detector comprising a tachometer.

3. A laser perforating apparatus as claimed in claim 1, wherein said pulse generator comprises pitch setting means for setting the pitch of the holes to be formed in the workpiece, a divider for dividing the signal from the speed detector by the set pitch, and a voltage-frequency transducer for converting the output voltage from said divider into a pulse signal.

4. A laser perforating apparatus as claimed in claim 3, wherein said voltage-frequency transducer generates a pulse signal having its frequency increased when a feed speed of the workpiece is increased.

5. A laser perforating apparatus as claimed in claim 4, wherein an output pulse of said voltage-frequency transducer is a triangular wave.

6. A laser perforating apparatus as claimed in claim 3, wherein said first operator comprises a duty correction setter for increasing and decreasing said ratio in response to the detection signal of the speed detector, and a first adder for adding the set value of said setting means to the output signal of said duty correction setter.

7. A laser perforating apparatus as claimed in claim 6, wherein the set value of said setting means is within the voltage range of the pulse signal generated by the voltage-frequency transducer.

8. A laser perforating apparatus as claimed in claim 1, said comparator generating a signal for closing said switch means when the output voltage of the first operator is greater than the output voltage of said pulse generator and opening said switch means when the output voltage of the first operator is smaller than the output voltage of said pulse generator.

9. A laser perforating apparatus as claimed in claim 1, wherein said second operator comprises a laser output correction setter for increasing and decreasing the laser output value in response to the detection signal from the speed detector, and a second adder for adding the set value of the laser output setter to the output signal of said laser output correction setting means.

10. A laser perforating apparatus as claimed in claim 1, further comprising shutter means mounted between said laser oscillator and the workpiece, and means for controlling opening and closing of the shutter.

11. A laser perforating apparatus as claimed in claim 10, wherein said shutter control means receives said detection signal from the speed detector as an input, and operates to open the shutter when the feed speed of the workpiece reaches a predetermined value.

12. A laser perforating apparatus as claimed in claim 1, wherein said workpiece comprises an elongated web.

13. A laser perforating apparatus as claimed in claim 1, wherein said workpiece comprises an elongated plastic film.

14. A laser perforating apparatus as claimed in claim 1, wherein said workpiece comprises an elongated metal plate.

15. A laser perforating apparatus as claimed in claim 1, wherein the output signal of said pulse generator is applied as an input to a plurality of phase shifters, and further comprising a plurality of comparators to which the outputs from said plurality of phase shifters are applied as inputs, a plurality of switches and power sources, and a like plurality of laser oscillators disposed for forming a plurality of holes through said workpiece in parallel therewith.

16. A laser perforating apparatus as claimed in claim 5, wherein the phase shifts of said plurality of phase shifters are respectively different from one another.

* * * * *